US012386301B2

(12) United States Patent
Kurata

(10) Patent No.: US 12,386,301 B2
(45) Date of Patent: Aug. 12, 2025

(54) IMAGE FORMING APPARATUS

(71) Applicant: CANON KABUSHIKI KAISHA, Tokyo (JP)

(72) Inventor: Munehito Kurata, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/456,361

(22) Filed: Aug. 25, 2023

(65) Prior Publication Data

US 2024/0069481 A1 Feb. 29, 2024

(30) Foreign Application Priority Data

Aug. 29, 2022 (JP) ................................ 2022-135507

(51) Int. Cl.
*G03G 15/00* (2006.01)
*B65H 3/06* (2006.01)
*G03G 21/20* (2006.01)

(52) U.S. Cl.
CPC ........... *G03G 15/6511* (2013.01); *B65H 3/06* (2013.01); *G03G 21/203* (2013.01);
(Continued)

(58) Field of Classification Search
CPC ........... G03G 15/6511; G03G 15/6558; G03G 15/6591; G03G 15/6594;
(Continued)

(56) References Cited

U.S. PATENT DOCUMENTS

2005/0152709 A1* 7/2005 Osaki ................. G03G 15/2064 399/81
2011/0031683 A1* 2/2011 Asari ...................... B07C 5/165 271/264

(Continued)

FOREIGN PATENT DOCUMENTS

JP 2003285484 A * 10/2003
JP 2016136194 A 7/2016
JP 6388402 B2 9/2018

OTHER PUBLICATIONS

Machine Translation of JP 2003-285484 A. Oct. 7, 2003 (Year: 2003).*

*Primary Examiner* — Carla J Therrien
(74) *Attorney, Agent, or Firm* — Canon U.S.A., Inc. IP Division

(57) ABSTRACT

An image forming apparatus includes a sheet feeding cassette, a pickup roller to feed a sheet stored in the sheet feeding cassette, a conveyance roller, an image forming portion, first and second conveyance guides, a driving motor, a torque detection unit, and a control unit. The torque detection unit detects a value related to a driving torque of the driving motor produced in a period when the pickup roller feeds the sheet. The control unit determines an image forming condition under which image formation is to be performed on the sheet at the image forming portion. The control unit determines the image forming condition in accordance with a performed result of detection by the torque detection unit performed in a period in which the sheet is guided with both the first conveyance guide and the second conveyance guide by being conveyed with the conveyance roller and the sheet is bent.

7 Claims, 12 Drawing Sheets

(52) U.S. Cl.
CPC .. *B65H 2404/60* (2013.01); *B65H 2404/7431* (2013.01); *B65H 2515/32* (2013.01); *B65H 2515/40* (2013.01); *B65H 2515/805* (2013.01)

(58) Field of Classification Search
CPC .......... G03G 2215/00396; G03G 2215/00632; G03G 2215/00738; G03G 2215/00742; B65H 3/06–0692; B65H 2404/60–612; B65H 2404/7431; B65H 2515/32; B65H 2515/81
See application file for complete search history.

(56) References Cited

U.S. PATENT DOCUMENTS

| | | | | |
|---|---|---|---|---|
| 2013/0187329 | A1* | 7/2013 | Kato .................... | B65H 3/0669<br>271/225 |
| 2015/0185673 | A1* | 7/2015 | Atay .................. | H04N 1/00037<br>399/389 |
| 2017/0008715 | A1* | 1/2017 | Morino ................ | G03G 15/657 |

* cited by examiner

IMAGE FORMING APPARATUS

BACKGROUND

Field

The present disclosure relates to an image forming apparatus, such as a copying machine or a printer, that changes an image forming operation according to a type of recording material.

Description of the Related Art

Conventionally, image forming apparatuses, such as a copying machine and a laser printer, form an image in such a manner that a toner image formed on a photosensitive member is transferred to a sheet-type recording material, and the toner image on the recording material is heated and pressed under predetermined fixing conditions to be fixed to the recording material. Examples of the predetermined fixing conditions include a conveyance speed of a recording material and a heating temperature to be applied to the recording material, and the fixing conditions are controlled in accordance with a characteristic (particularly, grammage) of the recording material to maintain quality of the image. In conventional image forming apparatuses, users use an operation panel disposed in the image forming apparatus or an external device equipped with a printer driver to set a recording material type (for example, thin paper, plain paper, thick paper, rough paper, glossy paper). Then, the fixing conditions are controlled in accordance with a recording material characteristic corresponding to the set recording material type.

In order to reduce user's burden of setting a recording material type, Japanese Patent No. 6388402 discusses an image forming apparatus in which a sensor for detecting a recording material characteristic (hereinafter referred to as a media sensor) is disposed on a conveyance path of recording materials. In the image forming apparatus including the media sensor, a characteristic of a recording material in conveyance is detected with the media sensor, and the fixing conditions are automatically controlled in accordance with the detected characteristic of the recording material.

Japanese Patent Application Laid-Open No. 2016-136194 discusses a method of detecting a torque produced when a recording material passes through a fixing device to determine the thickness of the recording material, without using a media sensor. The fixing conditions are set in accordance with the detected thickness.

The configuration discussed in Japanese Patent Application Laid-Open No. 2016-136194 is cost effective since no media sensor is disposed. However, the determination target in the configuration discussed in Japanese Patent Application Laid-Open No. 2016-136194 is the thickness of a recording material, which is strictly different from the grammage of a recording material that is detected with a media sensor.

SUMMARY

The present disclosure is directed to providing a configuration in which a torque is measured at a curved part of a conveyance path for a recording material, to set image forming conditions more accurately and improve quality of an image to be formed on the recording material.

According to an aspect of the present disclosure, an image forming apparatus includes a sheet feeding cassette configured to store a sheet, a pickup roller configured to feed the sheet stored in the sheet feeding cassette, a conveyance roller configured to convey the sheet fed by the pickup roller, an image forming portion where an image is to be formed on the sheet conveyed by the conveyance roller, a first conveyance guide configured to guide the sheet conveyed by the conveyance roller, wherein the first conveyance guide is disposed at a position that is upstream from the image forming portion with respect to a conveyance direction in a conveyance path of the sheet, and the first conveyance guide further is configured to guide the sheet in a direction away from the image forming portion when viewed in a vertical direction, a second conveyance guide configured to guide the sheet conveyed by the conveyance roller, wherein the second conveyance guide is connected to the first conveyance guide, is disposed at a position that is upstream from the image forming portion and downstream from the first conveyance guide with respect to the conveyance direction, and further is configured to guide the sheet in a direction approaching the image forming portion when viewed in the vertical direction, a driving motor configured to drive the conveyance roller, a torque detection unit configured to detect a value related to a driving torque of the driving motor produced in a period in which the pickup roller feeds the sheet, and a control unit configured to determine an image forming condition under which image formation is to be performed on the sheet at the image forming portion, wherein the control unit determines the image forming condition in accordance with a period performed result of detection by the torque detection unit performed in a period in which the sheet is guided with both the first conveyance guide and the second conveyance guide by being conveyed with the conveyance roller and the sheet is bent.

Further features of the present disclosure will become apparent from the following description of exemplary embodiments (with reference to the attached drawings).

DESCRIPTION OF THE EMBODIMENTS

Hereinafter, modes for carrying out the present disclosure will be exemplarily described in detail based on exemplary embodiments with reference to the drawings. Dimensions, materials, shapes, relative positions, and the like of components described in the exemplary embodiments should be appropriately changed in accordance with a configuration and various conditions of an apparatus to which the present disclosure is applied. That is, the scope of the present disclosure is not intended to be limited to the following exemplary embodiments.

(1) Image Forming Apparatus

Figure 1:
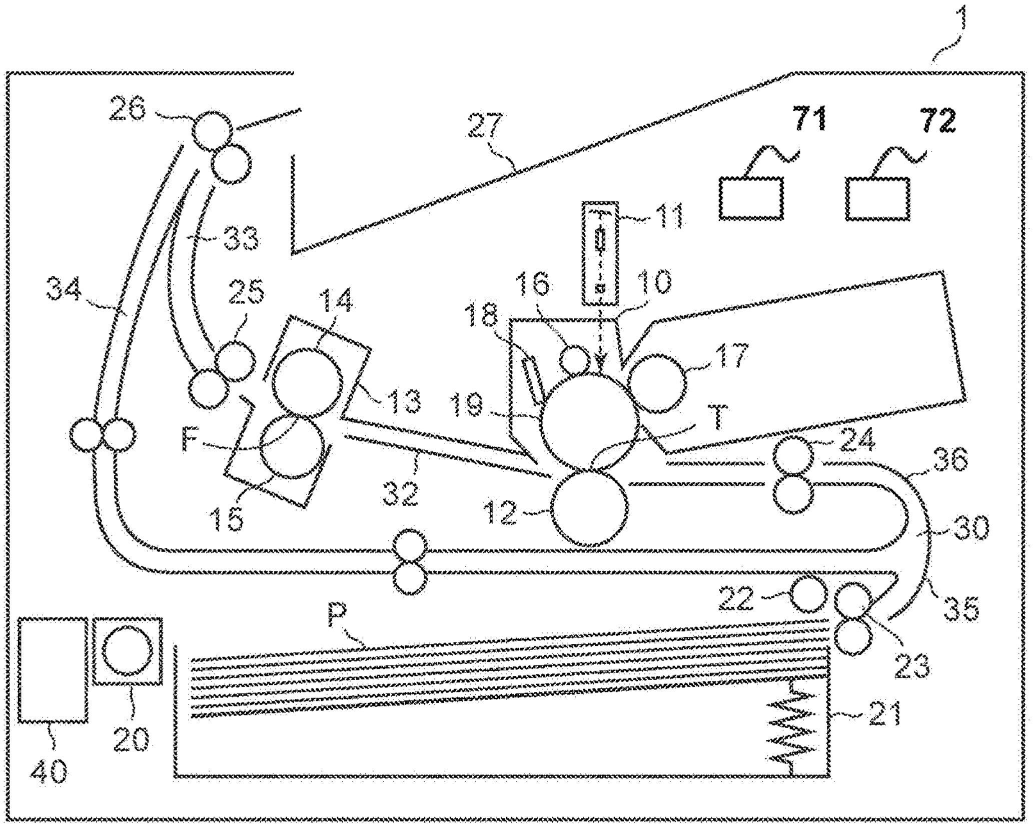
FIG. 1 is a schematic cross-sectional view of an image forming apparatus according to a first exemplary embodiment.

A configuration of an image forming apparatus 1 will be described with reference to FIG. 1. FIG. 1 is a schematic cross-sectional view of the image forming apparatus 1 according to a first exemplary embodiment. The image forming apparatus 1 is a laser printer that forms images on recording materials P (sheets) using an electrophotographic method.

In the image forming apparatus 1, a photosensitive drum 19 as an image bearing member, a charging roller 16 as a charging unit, a developing roller 17 as a developing unit, and a cleaning blade 18 as a cleaning unit are disposed in the form of a process cartridge 10 in such a manner that the process cartridge 10 is detachable from the apparatus main body of the image forming apparatus 1.

The image forming apparatus 1 further includes a sheet feeding cassette 21, a pickup roller 22, a sheet feeding roller 23, a registration roller pair 24, a transfer roller 12 as a transfer member, an image heating apparatus (fixing unit) 13, a fixing discharge roller pair 25, a discharge roller pair 26, a motor 20 as a driving motor, and a control unit 40.

Figure 2:
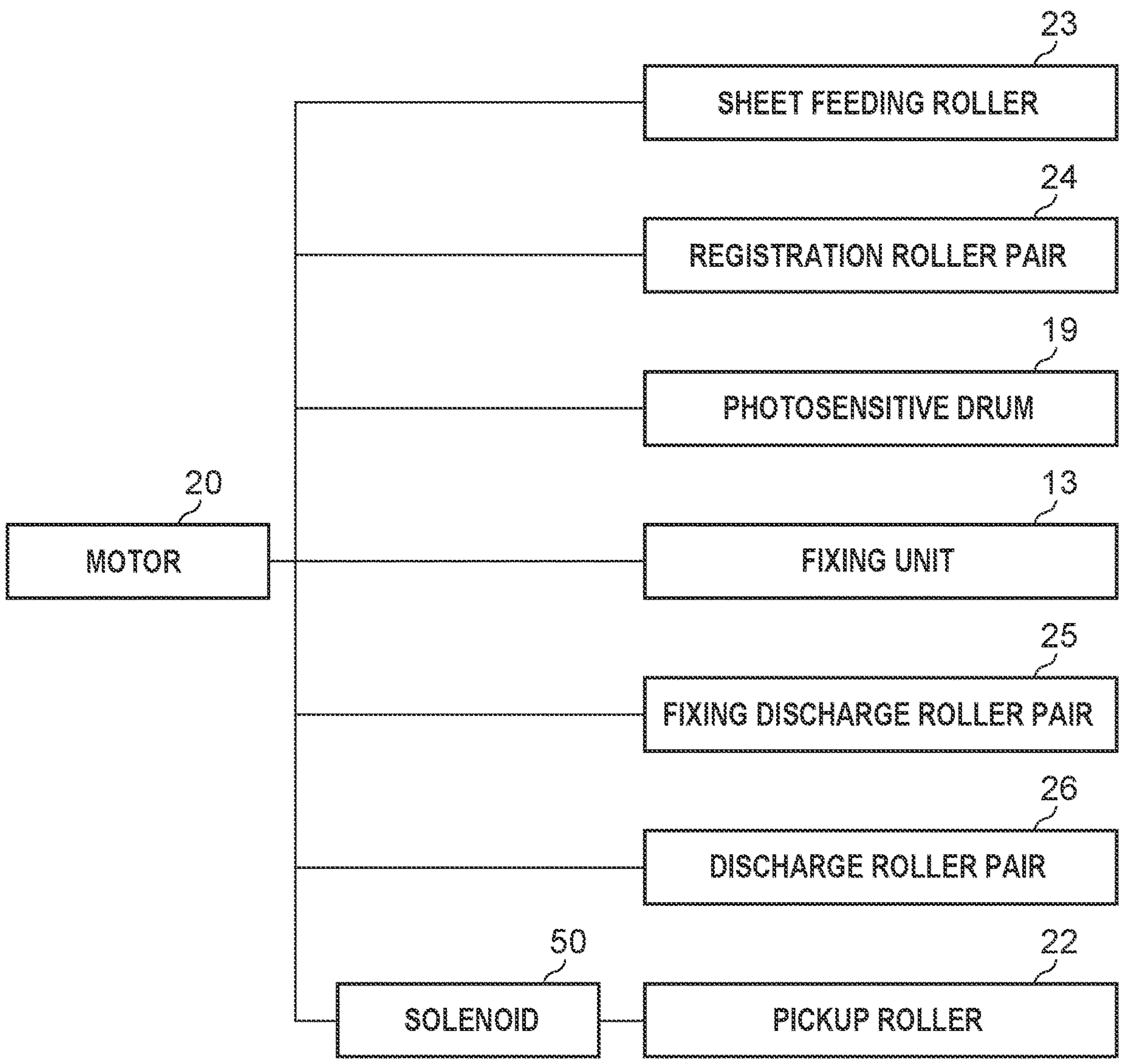
FIG. 2 is a diagram illustrating drive transmission of the image forming apparatus according to the first exemplary embodiment.

According to the present exemplary embodiment, the motor 20 serves as all of the drive sources of the sheet feeding roller 23, the registration roller pair 24, the photosensitive drum 19, the fixing unit 13, the fixing discharge roller pair 25, the discharge roller pair 26, and the like. FIG. 2 is a diagram illustrating drive transmission of the image forming apparatus 1. A solenoid 50 is disposed between the motor 20 and the pickup roller 22.

The photosensitive drum 19 is rotationally driven at a predetermined peripheral speed (process speed) in the clockwise direction in FIG. 1. The charging roller 16 uniformly charges a circumferential surface of the photosensitive drum 19 to a predetermined polarity and potential. The charged circumferential surface of the photosensitive drum 19 is scanned with and exposed to laser light emitted from a laser scanner 11.

The laser scanner 11 as an image exposure unit outputs laser light which has been on/off-modulated in accordance with time-series electric digital pixel signals of target image information input from an external device, such as an image scanner or a computer (not illustrated). This scanning exposure eliminates charges of exposed bright parts on the circumferential surface of the photosensitive drum 19, and forms an electrostatic latent image corresponding to the target image information on the circumferential surface of the photosensitive drum 19.

The developing roller 17 carries a developer (toner) on a surface thereof and supplies the toner to a circumferential surface of the photosensitive drum 19 to sequentially develop the electrostatic latent image formed on the circumferential surface of the photosensitive drum 19 as a toner image. Laser printers generally use a reversal development method that applies toner to the exposed light parts of an electrostatic latent image to develop the electrostatic latent image.

The sheet feeding cassette 21 is attachable to and detachable from the apparatus main body of the image forming apparatus 1, and the recording materials P are stacked and stored in the sheet feeding cassette 21. Each of the recording materials P in the sheet feeding cassette 21 is conveyed to a sheet feeding roller 23 by a pickup roller 22 in response to a sheet feeding start signal. The sheet feeding roller 23 forms a separation nip portion with a separation roller, and the recording materials P conveyed by the pickup roller 22 are separated one by one with the separation nip portion.

The separated recording material P is fed toward a first conveyance guide 35 described below. According to the present exemplary embodiment, the pickup roller 22 rotates when the solenoid 50 is turned on. Then, as the pickup roller 22 rotates once, one recording material P is conveyed from the sheet feeding cassette 21. The control unit 40 is a unit that outputs an ON signal to the solenoid 50.

The recording material P fed in the image forming apparatus 1 by the pickup roller 22 and the sheet feeding roller 23 passes through a conveyance path 30 at a position upstream from an image forming portion and is conveyed to the registration roller pair 24. Next, the recording material P conveyed to the registration roller pair 24 is guided into a transfer nip portion T serving as the image forming portion formed between the photosensitive drum 19 and the transfer roller 12.

In the conveyance path 30 when viewed in the vertical direction with respect to a conveyance direction of the recording material P, a guide part that guides the recording material P in a direction away from the image forming portion is referred to as the first conveyance guide 35, and a guide part that guides the recording material P in a direction approaching the image forming portion is referred to as a second conveyance guide 36. The first conveyance guide 35 and the second conveyance guide 36 are connected to each other, and the second conveyance guide 36 is disposed at a position downstream from the first conveyance guide 35 with respect to the conveyance direction of the recording material P. That is, the pickup roller 22 conveys the recording material P stored in the sheet feeding cassette 21 to the first conveyance guide 35, and the recording material P is guided to the transfer nip portion T via the second conveyance guide 36.

The recording material P guided into the transfer nip portion T is nipped and conveyed through the transfer nip portion T, through which a transfer voltage controlled to a predetermined voltage value is applied to the transfer roller 12 by a high-voltage power supply (not illustrated). Application of the transfer voltage having the polarity opposite to a polarity of the toner to the transfer roller 12 causes the toner image formed on the circumferential surface of the photosensitive drum 19 to be electrostatically transferred to a surface (first surface) of the recording material P. The recording material P to which the toner image has been transferred is conveyed on a conveyance path 32 from the transfer nip portion T and guided to the fixing unit 13.

The fixing unit 13 includes a heating roller 14 and a pressure roller 15. The recording material P conveyed to the fixing unit 13 is nipped and conveyed through a fixing nip portion F formed between the heating roller 14 and the pressure roller 15. Through the fixing nip portion, the heating roller 14 controlled to have a predetermined temperature (fixing temperature) heats the toner image on the recording material P, and the toner image on the recording material P is fixed to the recording material P. The recording material P to which the toner image has been fixed with the fixing unit 13 is discharged from the fixing unit 13 by the fixing discharge roller pair 25 for discharging the recording materials P from the fixing unit 13, conveyed on a conveyance path 33, and then discharged out of the image forming apparatus 1 to a sheet discharge tray 27 by the discharge roller pair 26, which completes image formation.

In double-sided printing, after the recording material P is conveyed to the discharge roller pair 26, the discharge roller pair 26 is reversely rotated at a predetermined timing to pull back the recording material P into the image forming apparatus 1 again. The pulled-back recording material P is conveyed along a double-sided conveyance path 34, and image formation is performed on the other surface (second surface). Meanwhile, after the toner image has been transferred to the recording material P, the cleaning blade 18 cleans the circumferential surface of the photosensitive drum 19 to remove residual toner, paper dust, and the like.

The above operation is repeated to perform continuous image formation. The image forming apparatus 1 according to the present exemplary embodiment is able to print monochrome images on 40 sheets of A4 size [210 millimeters (mm)×297 mm] plain paper per minute at a process speed of 230 millimeters per second (mm/sec).

(2) Description of Fixing Unit 13

Figure 3:
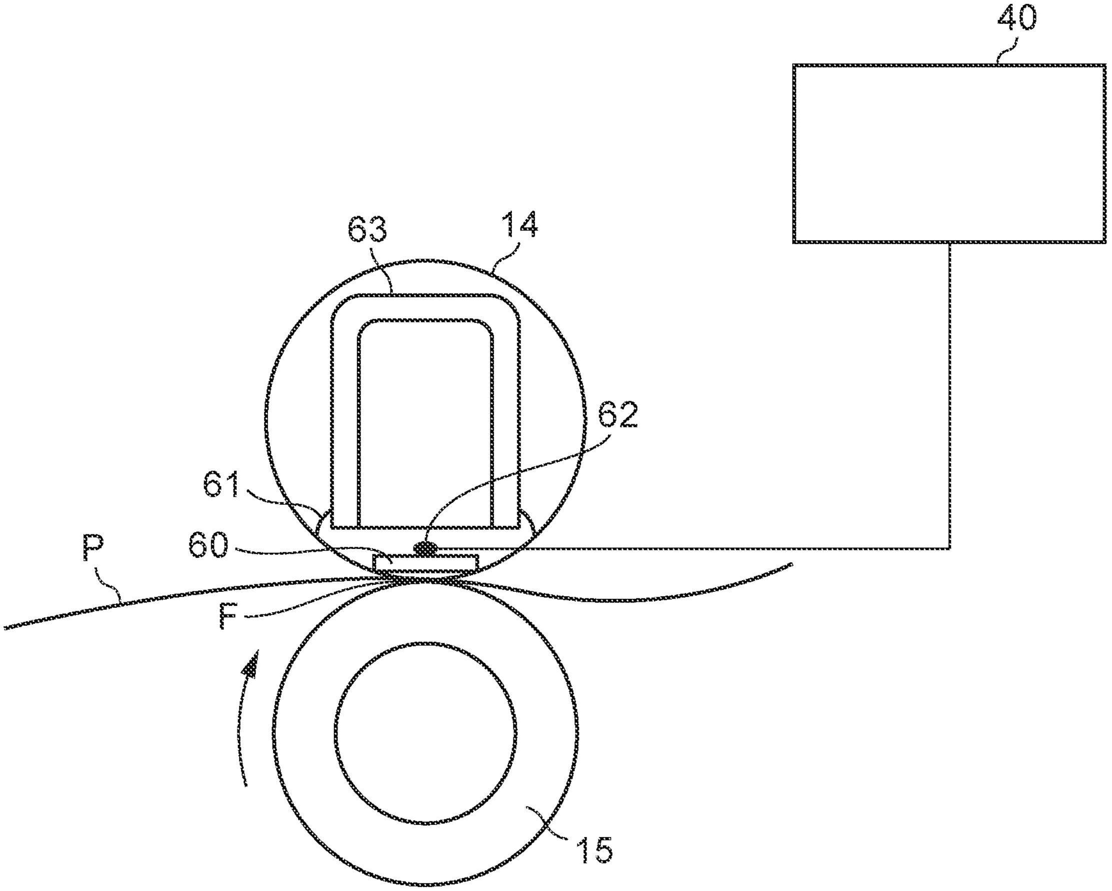
FIG. 3 is a schematic cross-sectional view of an image heating apparatus according to the first exemplary embodiment.

FIG. 3 is a diagram illustrating the fixing unit 13 according to the present exemplary embodiment. The fixing unit 13 includes the heating roller 14, the pressure roller 15, and a heater 60 serving as a heating member. The heater 60 is held with a heater holding member 61, and the heater holding member 61 holding the heater 60 is held with a metal stay member 63.

A pressing force from a pressing mechanism (not illustrated) is applied between the metal stay member 63 and the pressure roller 15, and the fixing nip portion F is formed by the pressure roller 15 pressing against the heating roller 14. When the recording material P is nipped and conveyed through the fixing nip portion F, unfixed toner image on the recording material P is fixed to the recording material P.

A thermistor 62 as a temperature detection element is in contact with the heater 60, and the control unit 40 controls energization to the heater 60 in such a manner that a temperature detected by the thermistor 62 becomes a desired target temperature, based on a detection result of the temperature detection element.

(3) Description of Motor 20 and Method for Detecting Driving Torque of Motor 20

According to the present exemplary embodiment, a brushless motor is used as the motor 20, and a mechanism for detecting a current (coil current) supplied to a coil of the motor 20 when the motor 20 is driven is disposed.

Figure 4:
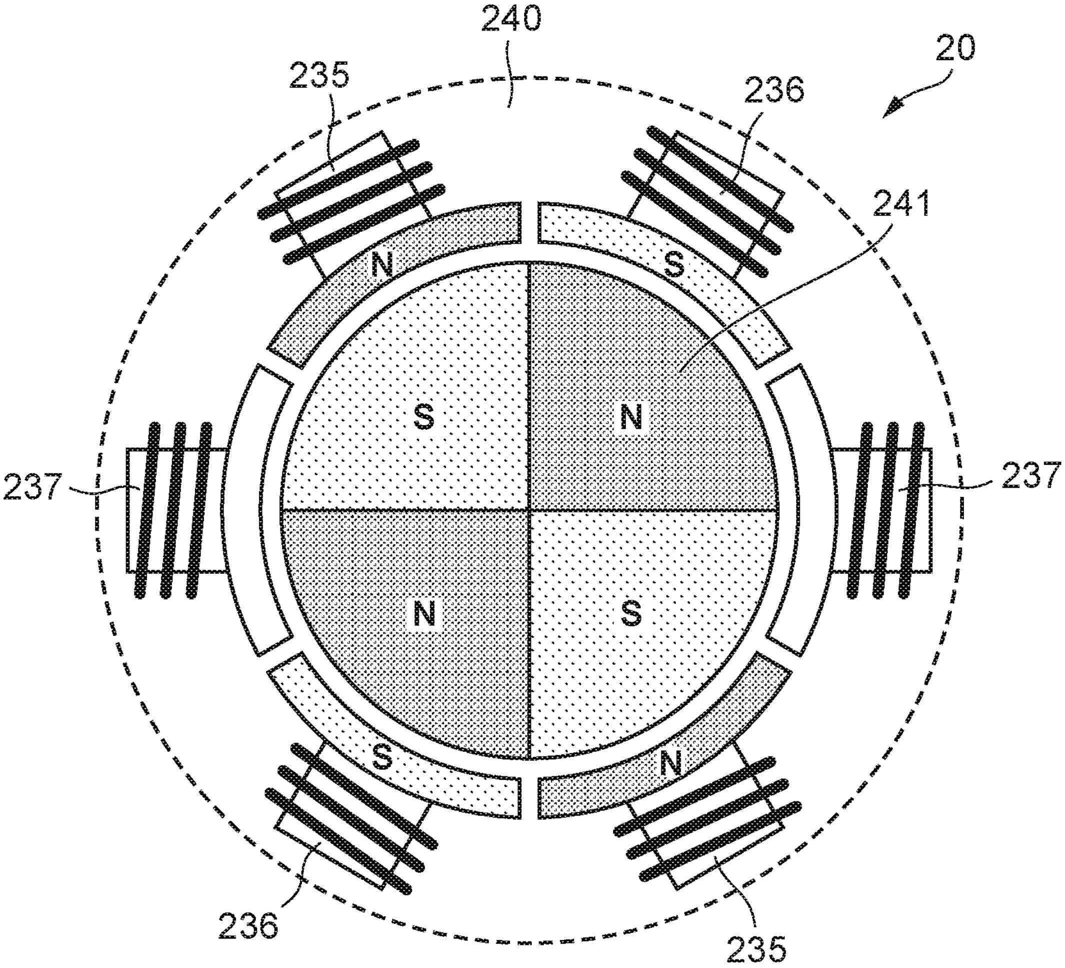
FIG. 4 is a schematic configuration diagram of a motor according to the first exemplary embodiment.

The structure of the motor 20 according to the present exemplary embodiment will be described with reference to FIG. 4. The motor 20 includes a stator 240 having six slots and a rotor 241 having four poles, and the stator 240 includes a coil 235 of U-phase, a coil 236 of V-phase, and a coil 237 of W-phase. The rotor 241 includes a permanent magnet that has two sets of N-S poles. The coil 235 of U-phase, the coil 236 of V-phase, and the coil 237 of W-phase are connected to an inverter 231 to be described below.

Figure 5:
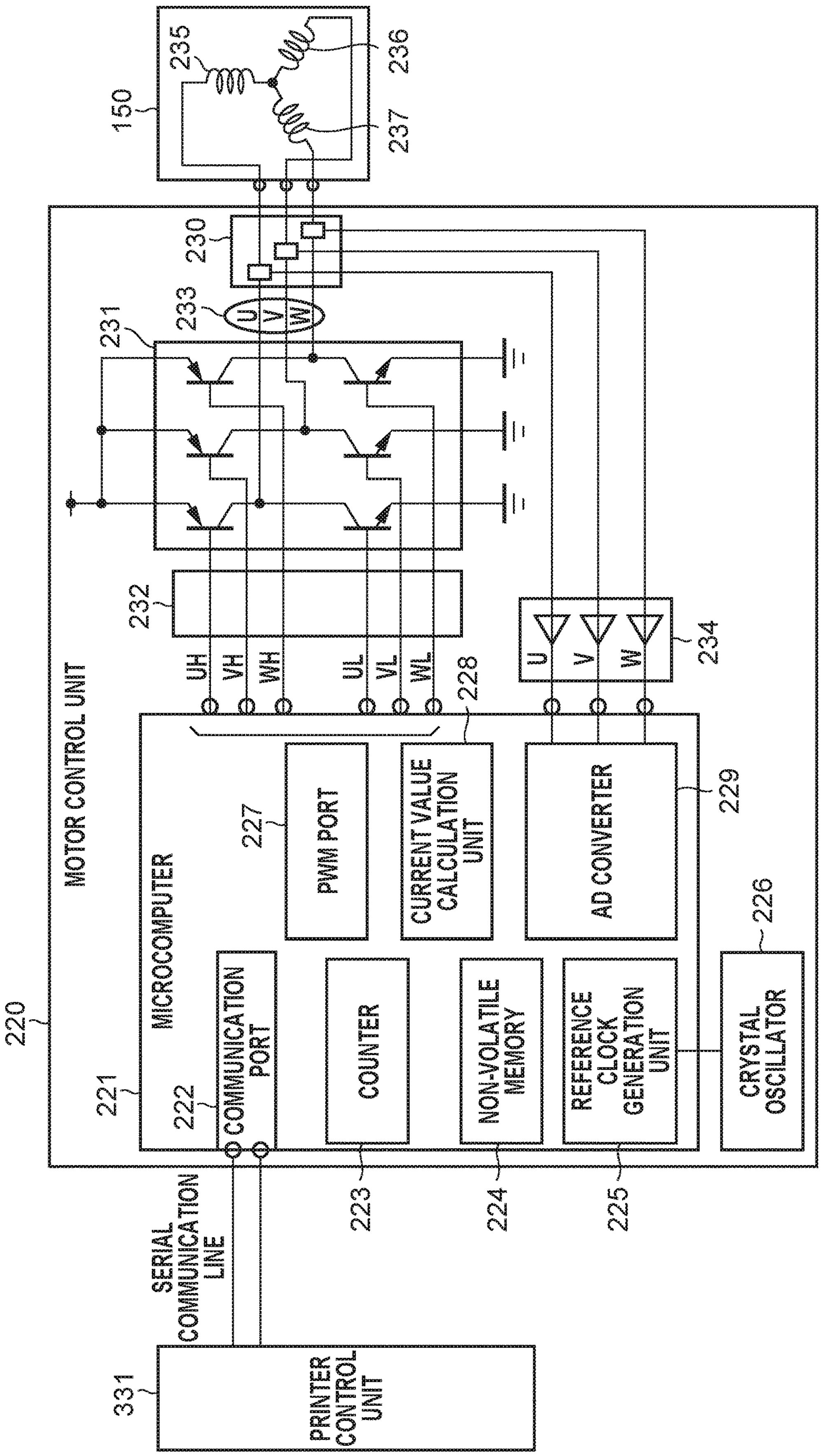
FIG. 5 is a control circuit diagram of the motor according to the first exemplary embodiment.

Next, a motor control unit 220 including a circuit for driving the motor 20 and a drive current detection mechanism will be described with reference to FIG. 5. The motor control unit 220 includes arithmetic processing means using, for example, a microcomputer 221. The microcomputer 221 includes a communication port 222, an analog-to-digital (AD) converter 229, a counter 223, a nonvolatile memory 224, a reference clock generation unit 225, a pulse-width modulation (PWM) port 227, and a current value calculation unit 228. The counter 223 performs a counting operation based on a reference clock generated by the reference clock generation unit 225, measures the cycle of input pulses, and generates a PWM signal based on the count value.

The PWM port 227 includes six terminals and outputs PWM signals of three high side signals (UH, VH, WH) and three low side signals (UL, VL, WL). The motor control unit 220 includes an inverter 231 of three phases including three high-side switching elements and three low-side switching elements. Examples of the switching elements include transistors and field-effect transistors (FET). The switching elements each connected to the PWM port 227 via the gate driver 232 are controlled to be ON/OFF in response to PWM signals output from the PWM port 227.

Each of the switching elements is turned on in a case where a corresponding PWM signal is greater than a predetermined value and is turned off in a case where the corresponding PWM signal is less than the predetermined value. U-phase, V-phase, and W-phase outputs 233 of the inverter 231 are connected to the coils 235, 236, and 237 of the motor 20, respectively, and coil currents flowing through the coils 235, 236, and 237 are able to be controlled. The coil currents flowing through the coils 235, 236, and 237 are each detected by a current detection unit. The current detection unit includes a current sensor 230, an amplifier unit 234, the AD converter 229, and the current value calculation unit 228.

First, the currents flowing through the coils 235, 236, and 237 are converted into voltages in the current sensor 230. The voltages are each amplified in the amplifier unit 234 and applied with an offset voltage, and are input to the AD converter 229 of the microcomputer 221. For example, in a case where the current sensor 230 outputs a voltage (V) of 0.01 per 1 ampere (A) with an amplification factor of 10 times in the amplifier unit 234 and an offset voltage applied of 1.6 V, the voltage outputted from the amplifier unit 234 when a current of −10 A to +10 A flows is 0.6 V to 2.6 V. The AD converter 229 outputs, for example, 0 to 4095 as an AD value with a voltage of 0 V to 3 V.

Accordingly, the AD value when a current of −10 A to +10 A flows is approximately 819 to 3549. The sign of a current is "+" when the current flows from the inverter 231 of three phases to the motor 20. The current value calculation unit 228 performs a predetermined calculation on AD converted data (hereinafter referred to as an AD value) to calculate a current value. That is, the current value is obtained by subtracting an offset value from the AD value and further multiplying the result by a predetermined coefficient. The offset value is an AD value at an offset voltage of 1.6 V, and the offset value is approximately 2184, and the coefficient is approximately 0.00733.

The offset value is obtained by reading an AD value output when no coil current flows, stored, and used. The coefficient is stored in advance in the nonvolatile memory 224 as a standard coefficient. The microcomputer 221 controls the inverter 231 of three phases via the gate driver 232 to cause currents to flow through the coils 235, 236, and 237 of the motor 20. The microcomputer 221 detects the coil currents with the current sensor 230, the amplifier unit 234, and the AD converter 229, and calculates the position of the rotor 241 and the speed of the motor 20 from the detected coil currents. Thus, the microcomputer 221 is able to control rotation of the motor 20.

Figure 6:
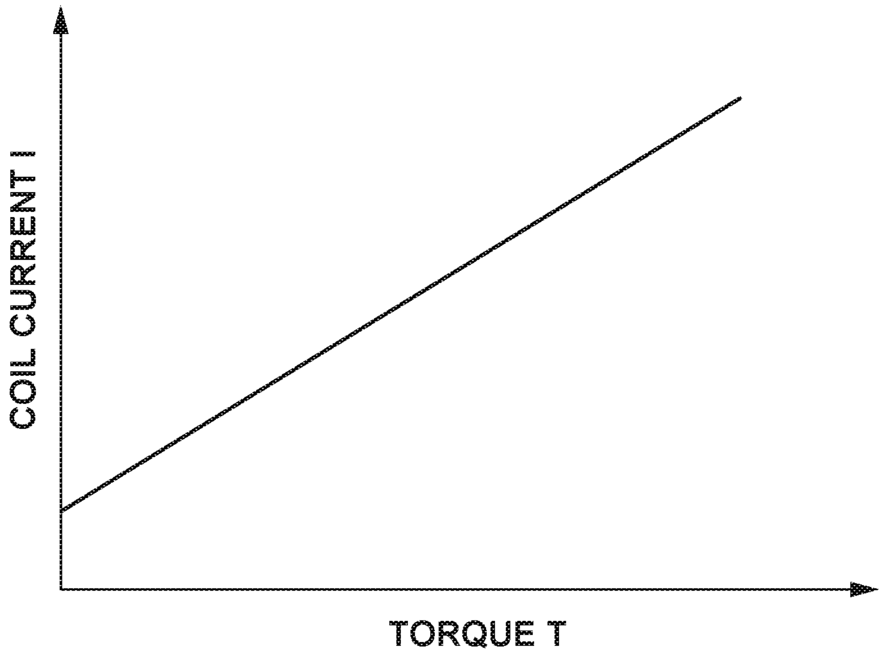
FIG. 6 is a diagram illustrating a relationship between a coil current and a driving torque of the motor according to the first exemplary embodiment.

FIG. 6 is a diagram illustrating a relationship between a motor torque T and a coil current I for driving the motor 20 (T-I characteristic). As described above, since there is a correlation between the motor torque T and the coil current I in the configuration of the motor 20 and the motor driving circuit according to the present exemplary embodiment, the motor torque T is calculated from the T-I characteristic of the motor 20. Specifically, a conversion equation obtained from a measurement result of the T-I characteristic is stored in advance in a nonvolatile memory of the control unit 40 in the apparatus main body of the image forming apparatus 1, and thus the torque of the motor 20 is able to be converted from the detected coil current.

While, according to the present exemplary embodiment, the motor torque T is converted from the coil current I, the coil current I may not be used as long as the motor torque T is obtainable by detecting a value related to a torque, such as a voltage.

(4) Description of Grammage Detection of Recording Material Using Driving Torque of Motor 20 During Sheet Feeding In the present exemplary embodiment, a grammage of the recording material P fed in the image forming apparatus 1 is obtained based on a driving torque of the motor 20 produced while the recording material P is fed in the image forming apparatus 1 by the pickup roller 22 and conveyed along the conveyance path 30. A grammage is a weight per unit area, and the unit is grams per square meter (g/m$^2$).

Figure 7:
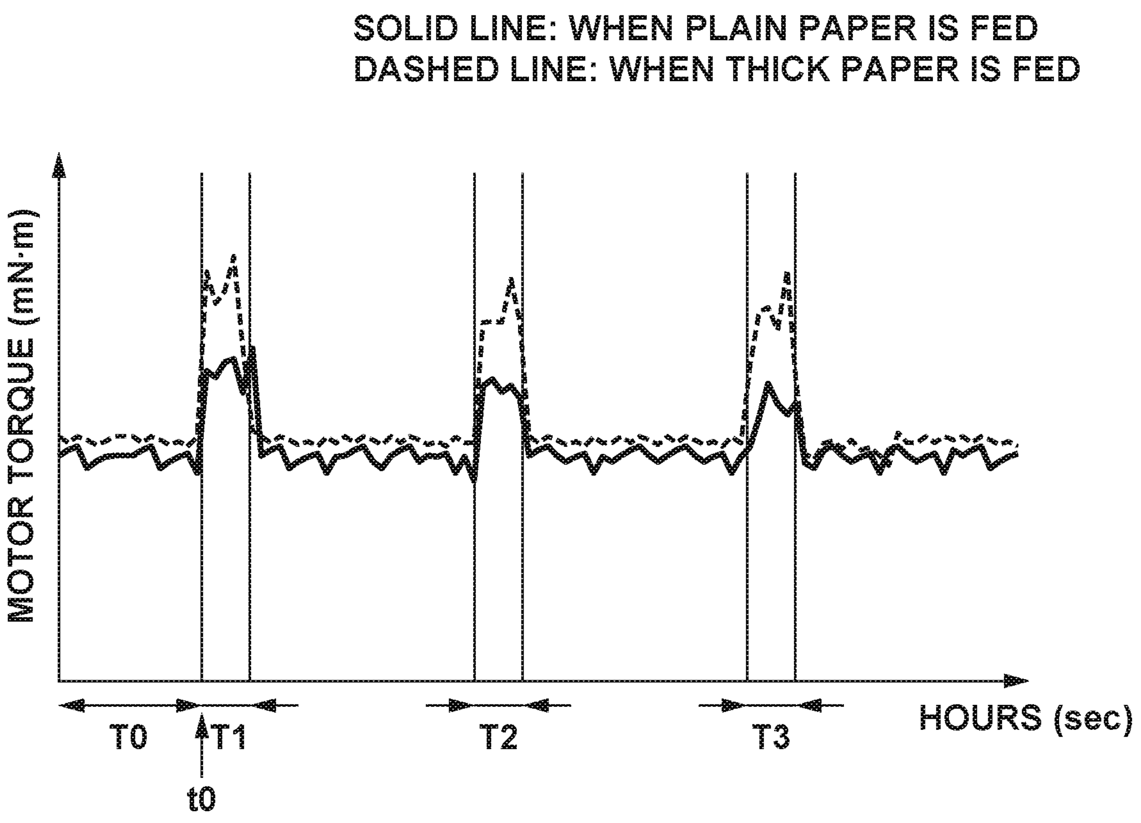
FIG. 7 is a diagram illustrating transitions of the driving torque of the motor according to the first exemplary embodiment when different recording materials are fed.

FIG. 7 is a diagram illustrating a transition of a driving torque of the motor 20 in a case where plain paper (Xerox Vitality Multipurpose Printer Paper manufactured by Xerox Holdings Corporation) having a grammage of 75 g/m$^2$ is fed (solid line) and a transition of a driving torque of the motor 20 in a case where thick paper (Xerox Vitality Index Paper manufactured by Xerox Holdings Corporation) having a grammage of 163 g/m$^2$ is fed (broken line). In each of the cases, three sheets were continuously fed.

A time t0 was a timing at which the recording material P was fed in the apparatus main body by the pickup roller 22. A period TO was a warm-up period before the recording material P was fed, and the fixing unit 13, the photosensitive drum 19, and the like had been already rotationally driven. A period T1 was a period from when the first recording material P was fed in the apparatus main body by the pickup roller 22 until when the first recording material P reached the registration roller pair 24. A period T2 and a period T3, each equivalent with the period T1, were of the second recording material P and the third recording material P, respectively.

In FIG. 7, in the periods T1, T2, and T3 from when the first, second, and third recording materials P, respectively, were fed by the pickup roller 22 until when reached the registration roller pair 24, the driving torque of the motor 20 increased, and further, the driving torque of the motor 20 in the case of feeding the thick paper was larger than the driving torque of the motor 20 in the case of feeding the plain paper.

The reason of the variation in driving torque will be described. As illustrated in FIG. 1, in the image forming apparatus 1 according to the present exemplary embodiment, the recording material P is fed by the pickup roller 22 and is then conveyed along the conveyance path 30 (the first conveyance guide 35 and the second conveyance guide 36), which is curved, to the registration roller pair 24. For example, the conveyance path 30 according to the present exemplary embodiment is curved in an arc shape with a curvature radius of 50 mm.

In a case where the recording material P is conveyed through such a curved conveyance path, the recording material P is conveyed with the leading end of the recording material P rubbed against a resin member (for example, polycarbonate resin, acrylonitrile butadiene styrene (ABS) resin, or polycarbonate/acrylonitrile butadiene styrene (PC/ABS) resin, among which according to the present exemplary embodiment, PC/ABS resin is used) forming the conveyance path 30. Consequently, a frictional force is generated in the direction in which conveyance of the recording material P is hindered.

As a result, a load corresponding to the above-described frictional force is applied to the pickup roller 22 until the recording material P reaches the registration roller pair 24. Thus, the rotational torque of the pickup roller 22 increases, and the driving torque of the motor 20 increases. This is the reason why the driving torque of the motor 20 increases during the period from when the recording material P is fed by the pickup roller 22 until when the recording material P reaches the registration roller pair 24.

Thus, according to the present exemplary embodiment, the driving torque is measured when the recording material P is guided with both the first conveyance guide 35 and the second conveyance guide 36 with the recording material P bent.

Next, the reason why the driving torque of the motor 20 in the case of feeding thick paper is larger than the driving torque of the motor 20 in the case of feeding plain paper will be described. When a grammage of the recording material P is large, the stiffness of the recording material P is also large. In a case where the stiffness of the recording material P is large, resistance to bending, that is, bending resistance force is large. When the bending resistance force of the recording material P is large, the force with which the recording material P conveyed along the conveyance path 30 in a curved-form rubs against the resin member forming the conveyance path 30 increases, and as a result, the frictional force that hinders conveyance of the recording material P also increases.

Consequently, the load applied to the pickup roller 22 also increases, and the driving torque of the motor 20 also increases. This is the reason why the driving torque of the motor 20 increases in the case where the thick paper is fed. If the curvature radius of the conveyance path 30 is larger than the 150 mm, the amount of bending of the recording material P decreases, which reduces the friction of the recording material P with the conveyance path 30. Since the difference in loads on the pickup roller 22 due to the difference in grammages of the recording materials P reduces, the difference in driving torques of the motor 20 is not able to be detected. Thus, the curvature radius of the conveyance path 30 is desirably less than or equal to 150 mm.

In the present exemplary embodiment, a grammage of a recording material P is obtained by utilizing the fact that the driving torque of the motor 20 at the time of sheet feeding is larger in the case where thick paper is fed as described above. Specifically, a grammage of a recording material P is calculated by the following Equation 1 based on results obtained by feeding a plurality of types of recording materials using the image forming apparatus 1 according to the present exemplary embodiment.

$$\text{Grammage of Recording Material (g/m}^2\text{)} = 6.63 \times \text{torque index} - 86.83 \qquad \text{(Equation 1)}$$

A torque index will now be described. The torque index is a difference between a mean value (feeding torque) of the driving torque of the motor 20 in the period T1 in FIG. 7, that is, a period from when the recording material P is fed until when the recording material P reaches the registration roller pair 24, and a mean value (reference torque) of the driving torque of the motor 20 in the period TO, that is, a predetermined time period before the recording material P is fed. That is, the torque index is a value calculated by the following Equation 2.

Torque Index=Feeding Torque−Reference Torque (Equation 2)

The period T1 will be described in more detail. The period according to the present exemplary embodiment from when the recording material P is fed until when the recording material P reaches the registration roller pair 24 is a period from when the solenoid 50 (illustrated in FIG. 2) is turned on to rotate the pickup roller 22 until when a predetermined time elapses. Specifically, the period T1 is about 0.3 seconds. In the configuration of the image forming apparatus 1 according to the present exemplary embodiment, the recording material P fed by the pickup roller 22 reaches the second conveyance guide 36 within a period of 0.3 seconds. That is, in the period T1, the recording material P that is in a largely curved state is guided by both the first conveyance guide 35 and the second conveyance guide 36. However, the present disclosure is not limited to such a configuration, and for example, a sensor can be additionally disposed to detect the position of the recording material P and measure the torque when the recording material P is at the position. That is, the position of the recording material P can be detected with the sensor to determine whether the recording material P is on both the first conveyance guide 35 and the second conveyance guide 36, and the torque in the state can be measured.

Here, the coefficient of Equation 1 in the present exemplary embodiment is an example of a case where the image forming apparatus 1 is used in an environment at a temperature of 23 degrees centigrade (° C.) and a humidity of 50 percent (%). The coefficient of Equation 1 for calculating a grammage can be appropriately changed in accordance with the configuration of the image forming apparatus 1 and the use environment.

Influence of noise in both the reference torque and the feeding torque is able to be removed by using averaged values obtained within a certain period of time. Further, calculating a reference torque every time the image forming operation is performed allows setting of the reference torque factoring in a change in a use environment (temperature, humidity, or the like) of the image forming apparatus 1.

Equation 1 is stored in the nonvolatile memory in the control unit 40 in the image forming apparatus 1. A torque index is calculated from the reference torque and the feeding torque obtained during conveyance of the recording material P, and is converted into a grammage. Table 1 is a list of detection results for grammages in a case where representative recording materials are fed to the image forming apparatus 1 according to the present exemplary embodiment. Each recording material was used after being sufficiently conditioned in an environment at a temperature of 23° C. and a humidity of 50%.

TABLE 1

Grammage Detection Results of Representative Recording Materials

| Recording Material | Actual Grammage ($g/m^2$) | Detected Grammage ($g/m^2$) |
|---|---|---|
| CS-068 manufactured by Canon Inc. | 68 | 69 |
| Vitality Multipurpose Paper manufactured by Xerox Holdings Corporation | 75 | 74 |
| Red Label Presentation manufactured by Canon Inc. | 80 | 81 |
| LaserJet manufactured by Hewlett-Packard Company | 90 | 91 |
| NPI Fine Paper manufactured by Canon Inc. | 128 | 127 |
| Vitality Index Paper manufactured by Xerox Holdings Corporation | 163 | 164 |
| Springhill Index manufactured by International Paper | 199 | 198 |

As shown in Table 1, the grammages were obtainable by the method according to the present exemplary embodiment.

The image forming apparatus 1 includes a thermometer 71 and a hygrometer 72. As described above, the image forming condition is able to be changed in accordance with measurement results of the thermometer 71 and the hygrometer 72 in addition to a torque detection result. Specifically, when the temperature or the humidity is high, the recording material P is softened, and thus the torque detection result is likely to be low. For this reason, in a state where the temperature and the humidity are high, the torque detection result is corrected (the grammage is calculated to be larger in comparison with a case with the equivalent torque detection result), which enables detection with higher accuracy. Either the temperature or the humidity can be used.

As described above, the grammage obtainment of a recording material using the driving torque of the motor 20 is able to be performed particularly using the driving torque at the time of feeding. Recent image forming apparatuses have been reduced in size, and in order to reduce the size of the main body, a conveyance path in which a conveyance direction of a recording material fed from a cassette is changed at a steep angle is generally used, and thus a frictional force due to bending resistance of a recording material is likely to be generated.

The grammage obtainment in the method according to the present exemplary embodiment is not limited to only the method using the driving torque at the time of sheet feeding. As illustrated in FIG. 1, in a case where the recording material P is conveyed along a curved part, such as the conveyance path 30, and a frictional force due to rubbing between the recording material and the conveyance path is generated, similar detection can be performed.

For example, in a case where the conveyance path 32, which is linear in FIG. 1, is in a curved shape, a load similar to that of the pickup roller 22 according to the present exemplary embodiment is applied to the registration roller pair 24. Thus, the driving torque of the motor 20 produced when the recording material P is conveyed from the registration roller pair 24 to the transfer nip portion T can be monitored, and a torque index for each recording material can be calculated. Similarly, the torque detection can be performed at a part between the double-sided conveyance path 34 and the conveyance path 30 where the recording material P is bent.

The torque detection according to the present exemplary embodiment is performed in a section where the pickup roller 22 conveys the recording material P. With this section set, the torque is able to be detected while the recording material P is on both the first conveyance guide 35 and the second conveyance guide 36.

On the other hand, on a part downstream from the transfer nip portion T, an unfixed toner image is formed on the recording material P. Thus, in a case of particularly thin paper, there is a possibility that the recording material P is in a state in which the bending resistance force is different from the original bending resistance force, and thus the accuracy of the grammage obtainment using the driving torque as in the method according to the present exemplary embodiment tends to be low. Further, on a part downstream from the fixing unit 13, the recording material P has been heated with the fixing unit 13, and also in this case, the bending resistance force is different from the original bending resistance force of the recording material P. Thus, the accuracy tends to be low in the grammage obtainment as in the method according to the present exemplary embodiment.

(5) Image Forming Conditions

As described above, the control unit 40 uses the driving torque of the motor 20 to obtain the grammage of the recording material P. According to the result, the control unit 40 determines image forming conditions, such as a transfer voltage, a fixing temperature, and a conveyance speed of the recording material P. For example, in a case where the control unit 40 determines that the recording material P has a large grammage, the control unit 40 sets the fixing target temperature to be high. This is because a recording material having a larger grammage requires a larger amount of heat to fix a toner image.

Further, in the case of the recording material P having a larger grammage, even if the fixing target temperature is set to be high, the amount of heat for fixing the toner image may be insufficient. In this case, the control unit 40 sets the conveyance speed of the recording material P to be low in addition to the adjustment of the target fixing temperature. Reducing the conveyance speed lengthens a time period of the recording material P passing through the fixing nip portion F, whereby a larger amount of heat is able to be applied to the toner image.

The image forming apparatus 1 according to the present exemplary embodiment has two types of conveyance speeds which are 230 mm/sec and 115 mm/sec. A conveyance speed of 230 mm/sec (hereinafter referred to as a first speed) is optimum for image formation of a recording material having a grammage of more than or equal to 60 g/m$^2$ to less than 105 g/m$^2$, and a conveyance speed of 115 mm/sec (hereinafter referred to as a second speed) is optimum for image formation of a recording material having a grammage of more than or equal to 105 g/m$^2$ to less than 199 g/m$^2$. The optimum fixing target temperatures are also set in accordance with grammages as shown in Table 2.

TABLE 2

Fixing Target Temperature in accordance with Grammages

| Grammage (g/m$^2$) | Conveyance Speed (mm/sec) | Fixing Target Temperature (° C.) |
|---|---|---|
| from ≤60 to <75 | 230 | 180 |
| from ≤75 to <90 | | 190 |
| from ≤90 to <105 | | 200 |
| from ≤105 to <150 | 150 | 170 |
| from ≤150 to ≤199 | | 180 |

Figure 8:
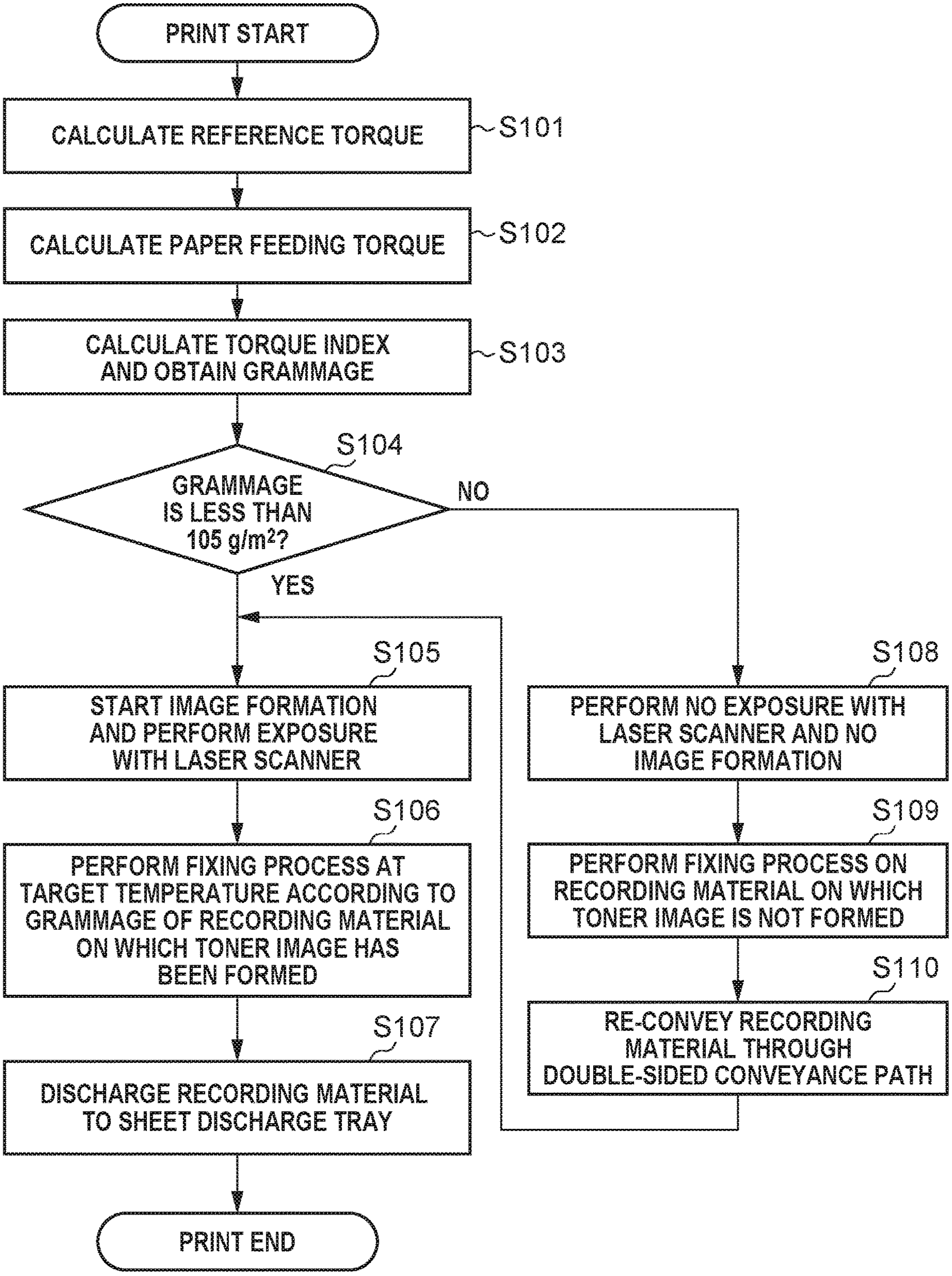
FIG. 8 is an operation flowchart of the image forming apparatus according to the first exemplary embodiment.

(6) Operation Control of Image Forming Apparatus according to Present Exemplary Embodiment An operation of the image forming apparatus 1 in the present exemplary embodiment will be described using the flowchart illustrated in FIG. 8. The flowchart illustrated in FIG. 8 is implemented by a CPU (not illustrated) included in the control unit 40 executing a program stored in a nonvolatile memory, such as a read-only memory (ROM) (not illustrated).

In step S101, when the image forming apparatus starts a printing operation and driving at the first speed is performed, the control unit 40 calculates a reference torque, which is a mean value of the driving torque of the motor 20. In step S102, when the recording material P is conveyed by the pickup roller 22, the control unit 40 calculates a feeding torque, which is a mean value of the driving torque of the motor 20 until the recording material P reaches the registration roller pair 24.

In step S103, the control unit 40 calculates a torque index and obtains a grammage of the recording material P. In step S104, the control unit 40 determines whether the detected grammage is less than 105 g/m$^2$. In a case where the grammage is less than 105 g/m$^2$ (YES in step S104), the processing proceeds to step S105. In step S105, the control unit 40 starts image formation by starting exposure with the laser scanner 11 and forming an electrostatic latent image on the photosensitive drum 19. In step S106, the recording material P to which a toner image has been transferred at the transfer nip portion T is conveyed to the fixing unit 13, and a fixing process is performed.

In this process, the target temperature of the fixing unit 13 is set to a target temperature corresponding to the obtained grammage of the recording material P. Specifically, in accordance with the obtained grammage of the recording material P, one of the target temperatures 180° C., 190° C., and 200° C. is set with reference to Table 1. In step S107, the recording material P subjected to the fixing process with the fixing unit 13 is discharged to the sheet discharge tray 27. In a case where printing is continuously performed on a plurality of recording materials P, the processing returns to step S101 to repeat the printing operation.

Next, a case where the grammage obtained by the control unit 40 in step S104 is more than or equal to 105 g/m$^2$ (NO in step S104) will be described. In this case, the control unit 40 determines that the second speed which is half the first speed is optimum as the conveyance speed of the recording material P. However, if the conveyance speed of the recording material P is changed from the first speed to the second speed at this timing, the laser scanner 11 starts exposure of the photosensitive drum 19 while the conveyance speed is being changed to the second speed. In the conveyance speed change, the timing of scanning to be performed on the laser scanner 11 and the timing of decreasing the rotation speed of the photosensitive drum 19 are different from each other, the image is to be deformed.

Similarly, the way of conveyance speed changes varies among the rollers conveying the recording material P due to, for example, differences in drive transmission paths. Thus, the conveyance speed is not changed during conveyance of the recording material P. Meanwhile, if the toner image is transferred to the recording material P and conveyed to the fixing unit 13 while the conveyance speed is maintained at the first speed, the amount of heat to be applied to the toner image is insufficient and the fixing failure occurs as described above.

Thus, according to the present exemplary embodiment, in a case where the control unit 40 determines that the second speed is optimum as the conveyance speed of the recording material P, formation of a toner image is not performed on the first surface of the recording material P. That is, in step S108, the conveyance speed of the recording material P is maintained at the first speed, exposure with the laser scanner 11 is not started, and formation of an electrostatic latent image on the photosensitive drum 19 is not performed. As a result, no toner image is transferred to the recording material P at the transfer nip portion T.

In step S109, the recording material P to which no toner image is transferred is conveyed to the fixing unit 13, and the same operation as the fixing process is performed. Since the toner image fixing is not necessary, the target temperature of the fixing unit 13 at this process can be set to a low target temperature within a range in which the rotational torque of the heating roller 14 and the pressure roller 15 does not become too large. According to the present exemplary embodiment, the target temperature of the fixing unit 13 is set to 150° C.

In step S110, the recording material P discharged from the fixing unit 13 is not discharged to the sheet discharge tray 27, but the recording material P conveyed to the discharge roller pair 26 is pulled back into the image forming apparatus 1 by reverse rotation of the discharge roller pair 26 being rotated at a predetermined timing. Then, the recording material P passes through the double-sided conveyance path 34 and is conveyed again at the first speed. In step S105, on the second surface of the re-conveyed recording material P, image formation is performed at the first speed.

That is, exposure with the laser scanner 11 and development are performed, and a toner image formed on the photosensitive drum 19 is transferred to the recording material P at the transfer nip portion T. In step S106, the recording material P to which the toner image has been transferred is conveyed to the fixing unit 13 and subjected to the fixing process. The fixing temperature in this process is 200° C., which is a highest temperature that can be set at the first speed. In step S107, the recording material P on which the fixing process has been performed is discharged to the sheet discharge tray 27, and the printing operation ends.

Here, the reason why no fixing failure occurs in the operation according to the present exemplary embodiment even when the recording material P to be originally conveyed at the second speed is conveyed at the first speed will be described. According to the present exemplary embodiment, the recording material P on which no toner image is formed is heated once in the fixing unit 13. Consequently, the temperature of the recording material P has been sufficiently warmed as compared with the room temperature.

The amount of heat that is required for fixing the toner image formed on the recording material P once heated to a high temperature is smaller than the amount of heat that is required for fixing the toner image formed on the recording material P in a room temperature state. For the above-described reason, in the operation according to the present exemplary embodiment, no fixing failure occurs even when the recording material which is to be originally conveyed at the second speed is conveyed at the first speed.

In a case where printing is continuously performed on a plurality of recording materials P, because it is able to be determined that the second and subsequent recording materials P are also recording materials P having a grammage of more than 105 g/m$^2$, which is to be originally conveyed at the second speed, feeding of the second recording material P is put on standby until the first recording material P is discharged. Then, the conveyance speed of the second and subsequent recording materials P is set to the second speed, and the printing operation is started. As shown in Table 1, the target fixing temperature is set to 170° C. or 180° C. in accordance with the grammage of the recording materials P.

While, according to the present exemplary embodiment, an example in which the fixing target temperature is changed in accordance with the grammage has been described, the configuration is not limited thereto. For example, other image forming conditions, such as a transfer voltage, can be changed in accordance with the grammage.

According to the present exemplary embodiment, the control unit 40 obtains the grammage of the recording material P calculated based on information about the driving torque of the motor 20, and the control unit 40 sets the image forming conditions based on the grammage. However, the configuration is not limited thereto. Alternatively, for example, the image forming conditions can be obtained directly from information about the driving torque of the motor 20. Directly associating the information about the driving torque and the image forming conditions with each other allows the image forming conditions to be set without obtaining the grammage of the recording material P.

According to the present exemplary embodiment, the control unit 40 functions as a calculation unit and calculates the grammage and the torque index of the recording material P by Equation 1 and Equation 2. However, the configuration is not limited thereto. Alternatively, for example, a table to be used to obtain the grammage and the torque index of the recording material P can be stored in the nonvolatile memory, such as the ROM, included in the control unit 40. Utilizing the table reduces processing load of the control unit 40 because calculation processing for obtaining the grammage and the torque index of the recording material P is able to be omitted.

Figure 12:
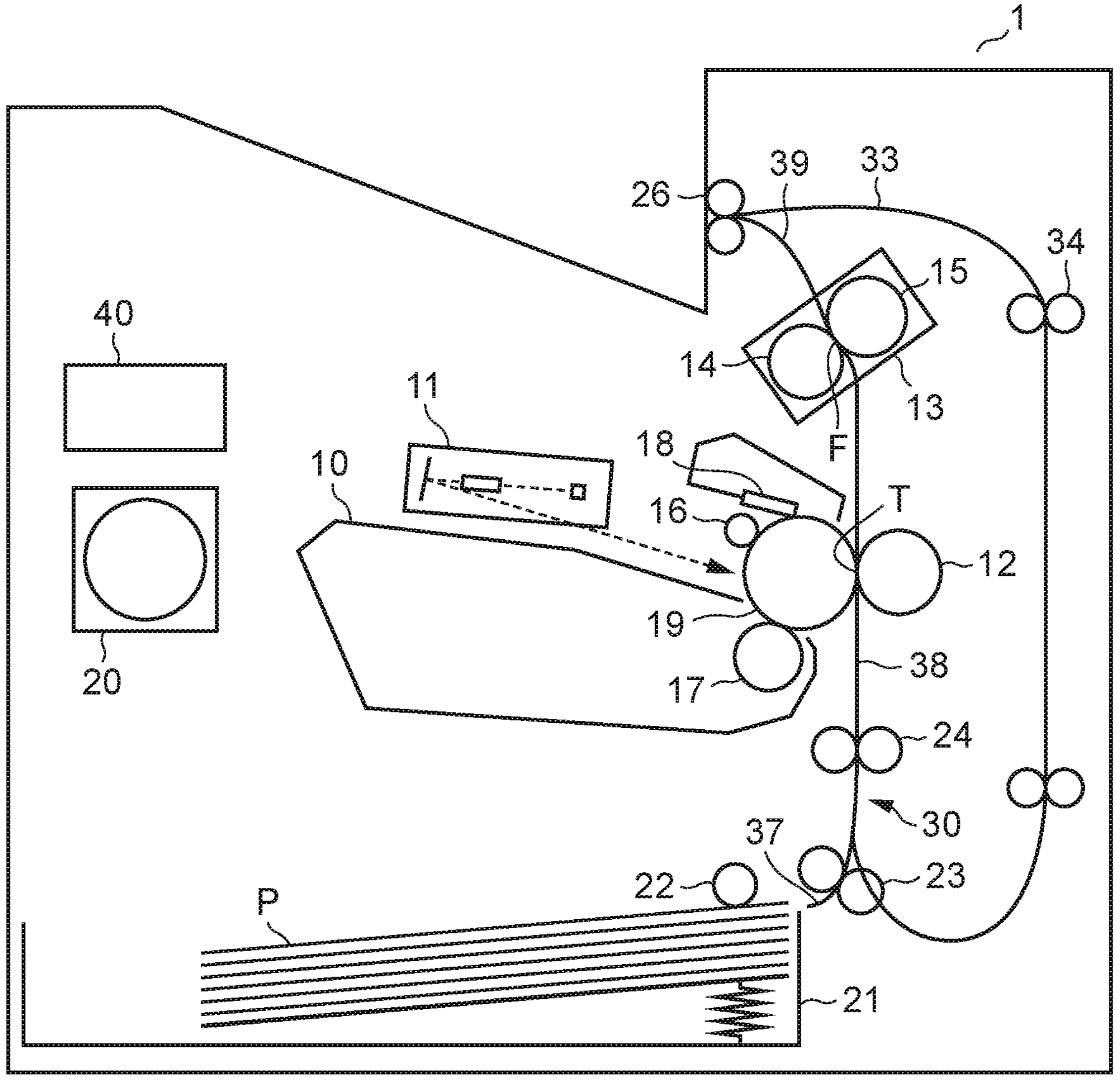
FIG. 12 is a schematic cross-sectional view of another image forming apparatus according to the first exemplary embodiment.

While the image forming apparatus 1 having an S-path structure in which the conveyance path as a guide of conveyance movement of a recording material P forms an S-shape has been described, the configuration is not limited thereto. Alternatively, for example, as illustrated in FIG. 12, an image forming apparatus 1 having a C-path structure in which a recording material P is conveyed in a C-shape can also be used. A case where the present exemplary embodiment is applied to the image forming apparatus 1 illustrated in FIG. 12 will be described.

First, a conveyance path of the recording material P will be described. The image forming apparatus 1 includes a third conveyance guide 37 that guides the recording material P stored in the sheet feeding cassette 21 in the right (first direction) in the drawing with respect to the conveyance direction of the recording material P when viewed in the vertical direction. The image forming apparatus 1 further includes a fourth conveyance guide 38 that is connected to the third conveyance guide 37 and guides the recording material P upward in the downstream part of the third conveyance guide 37, and a fifth conveyance guide 39 that is connected to the fourth conveyance guide 38 and guides the recording material P in the left (second direction) opposite to the first direction when viewed in the vertical direction in the downstream part of the fourth conveyance guide 38. The transfer nip portion T is disposed to the fourth conveyance guide 38, and the second direction is a direction in which the recording material P is discharged.

Even in the above described configuration, since the recording material P is conveyed while being curved, the grammage is able to be obtained through torque detection in a state where the recording material P is on both the third conveyance guide 37 and the fourth conveyance guide 38, and the image forming condition can be changed.

In the present exemplary embodiment, in a case where it is determined that the grammage of the recording material P as the first sheet of a print job does not correspond to the first speed but the grammage of the recording material P corresponds to the grammage to be conveyed at the second speed, which is half the first speed, no toner image is formed on the first surface of the recording material P during conveyance, and a toner image is formed and fixed while being conveyed at the first speed during conveyance for image forming on the second surface.

In a second exemplary embodiment, in addition to the configuration of the first exemplary embodiment, the conveyance speed of the recording material P is changed during a period in which the recording material P is conveyed along the double-sided conveyance path 34. Configuration of an image forming apparatus, a grammage obtainment method, and image forming conditions according to the present exemplary embodiment are the same as those in the first exemplary embodiment, and thus the detailed redundant description will be omitted.

Figure 9:
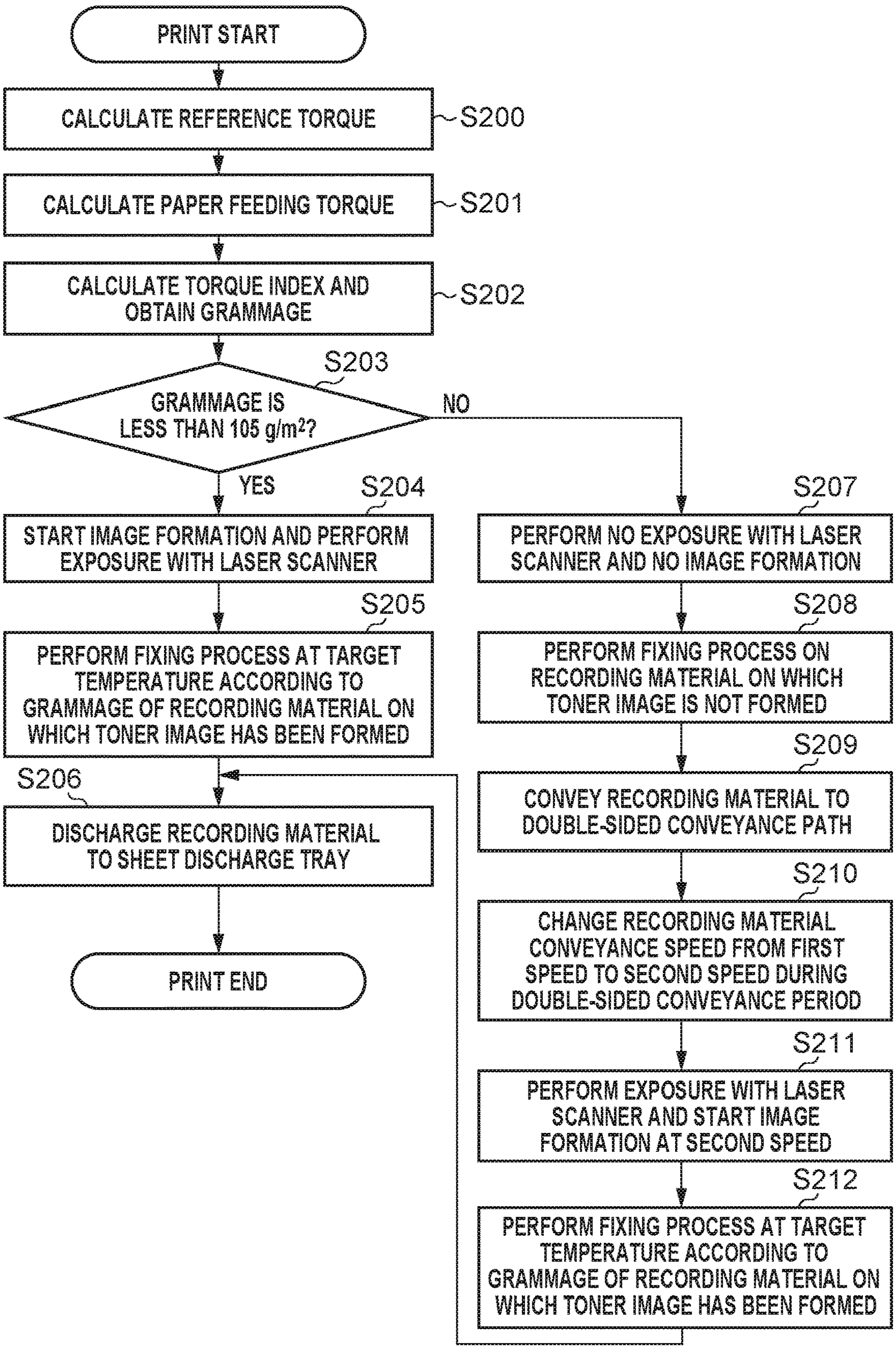
FIG. 9 is an operation flowchart of an image forming apparatus according to a second exemplary embodiment.

An operation of the image forming apparatus according to the present exemplary embodiment will be described with reference to a flowchart illustrated in FIG. 9. In step S200, the image forming apparatus starts a printing operation, driving is performed at the first speed, and the control unit 40 calculates a reference torque, which is a mean value of the driving torque of the motor 20. In step S201, the control unit 40 calculates a feeding torque, which is a mean value of the driving torque of the motor 20 from when a recording material P is conveyed by the pickup roller 22 until when the recording material P reaches the registration roller pair 24.

In step S202, the control unit 40 calculates a torque index and obtains a grammage of the recording material P. In step S203, the control unit 40 determines whether the detected grammage is less than 105 g/m$^2$. In a case where the grammage is less than 105 g/m$^2$ (YES in step S203), the processing proceeds to step S204. In step S204, the control unit 40 starts image formation by starting exposure with the laser scanner 11 and forming an electrostatic latent image on the photosensitive drum 19. In step S205, the recording material P to which a toner image has been transferred at the transfer nip portion T is conveyed to the fixing unit 13, and a fixing process is performed on the recording material P on which the toner image has been formed.

In this process, the target temperature of the fixing unit 13 is set to a target temperature corresponding to the detected grammage of the recording material P. That is, in a case of a recording material P having a small grammage, the target temperature of the fixing unit 13 is set to be low, and in a case of a recording material P having a large grammage, the target temperature of the fixing unit 13 is set to be high. In step S206, the recording material P subjected to the fixing process in the fixing unit 13 is discharged to the sheet discharge tray 27. When printing is continuously performed on a plurality of recording materials P, the process returns to the S201 to repeat the printing operation.

Next, a case where the detected grammage is more than or equal to 105 g/m$^2$ (NO in step S203) will be described. In this case, the control unit 40 determines that the second speed is optimum as the conveyance speed of the recording material P, but is not able to change the conveyance speed for the same reason as that described in the first exemplary embodiment.

Meanwhile, in a case where a toner image is transferred to the recording material P and conveyed to the fixing unit 13 while the conveyance speed is maintained at the first speed, the amount of heat applied to the toner image is insufficient, and the fixing failure occurs, as described above. Thus, according to the present exemplary embodiment, similar to the first exemplary embodiment, in a case where the control unit 40 determines that the second speed is optimum as the conveyance speed of the recording material P, the toner image is not formed on the first surface of the recording material P.

That is, in step S207, the conveyance speed of the recording material P remains at the first speed, exposure with the laser scanner 11 is not started, formation of an electrostatic latent image on the photosensitive drum 19 is not performed, and thus image formation is not performed. As a result, no toner image is transferred to the recording material P at the transfer nip portion T.

In step S208, the recording material P to which no toner image is transferred is conveyed to the fixing unit 13, and the same operation as the fixing process is performed. The target temperature of the image heating apparatus in this process is 150° C.

In step S209, the recording material P discharged from the fixing unit 13 is not discharged to the sheet discharge tray 27, but the recording material P conveyed to the discharge roller pair 26 is pulled back into the image forming apparatus by reverse rotation of the discharge roller pair 26 being rotated at a predetermined timing, and the recording material P is conveyed to the double-sided conveyance path 34. In step S210, the recording material conveyance speed is changed from the first speed to the second speed during a period in which the recording material P is conveyed in the double-sided conveyance path 34.

During the period in which the recording material P is conveyed through the double-sided conveyance path 34, formation of an electrostatic latent image on the photosensitive drum 19 with the laser scanner 11 is not performed. Thus, it is possible to change the conveyance speed of the recording material P from the first speed to the second speed by changing the rotation speed of the motor 20. In step S211, on the second surface of the recording material P conveyed by the registration roller pair 24 at the second speed, image formation is performed at the second speed.

That is, exposure with the laser scanner 11 and development are performed, and a toner image formed on the photosensitive drum 19 is transferred to the recording material P at the transfer nip portion T. In step S212, the recording material P to which the toner image has been transferred is conveyed to the fixing unit 13 and subjected to the fixing process. The fixing temperature at this process is set to an optimum target temperature corresponding to the grammage of the recording material P. That is, 170° C. or 180° C. is set with reference to Table 1. In step S206, the recording material P on which the fixing process has been performed is discharged to the sheet discharge tray 27, and the printing operation ends.

As described above, according to the present exemplary embodiment, the conveyance speed is changed from the first speed to the second speed during the period in which the recording material P which is to be originally conveyed at the second speed is conveyed in the double-sided conveyance path 34. With this configuration, in a case where the toner image is formed on the second surface of the recording material P, the recording material P is able to be conveyed at the second speed which is the optimum speed. Thus, the transfer voltage at the transfer nip portion T and the target temperature during the fixing process in the fixing unit 13 is able to be set to more optimal values.

Figure 10:
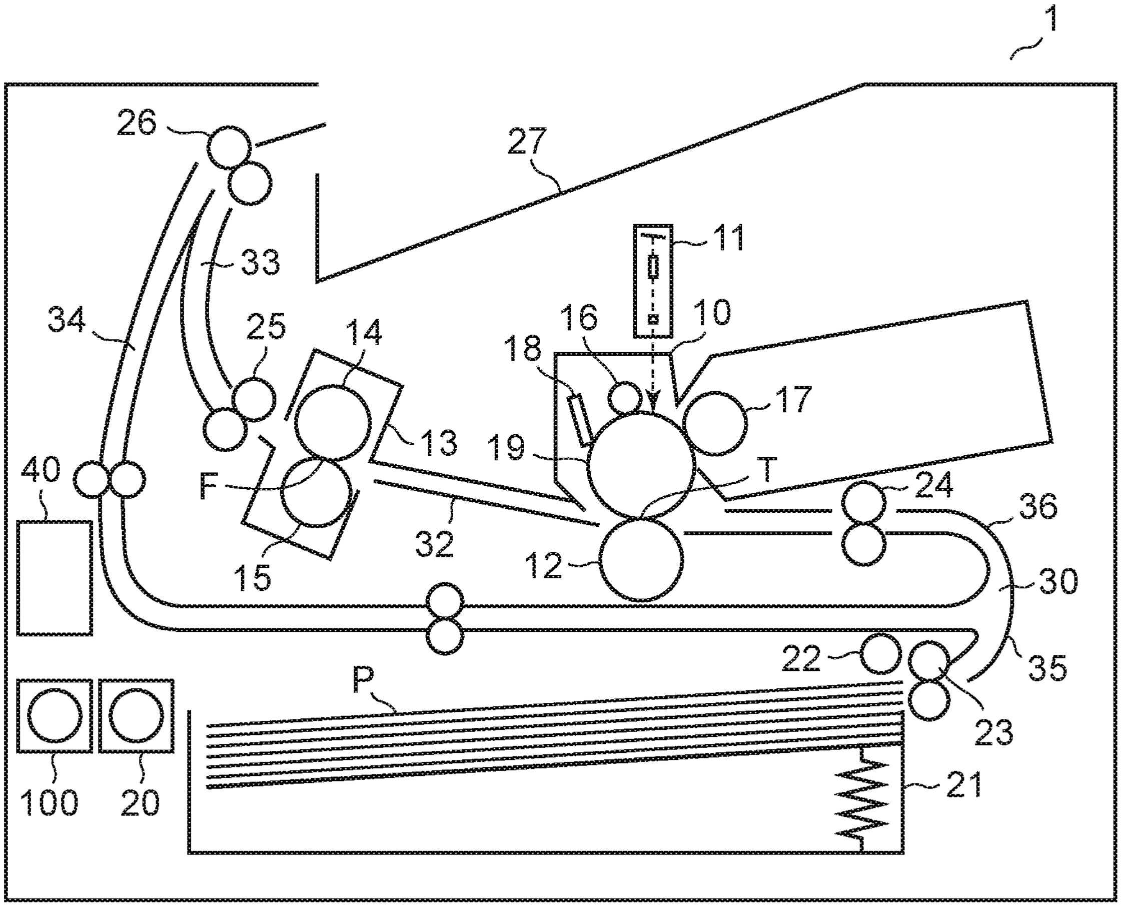
FIG. 10 is a schematic cross-sectional view of an image forming apparatus according to a third exemplary embodiment.

According to the first and second exemplary embodiments, the image forming apparatus is provided with one motor. According to a third exemplary embodiment, a plurality of motors are disposed. According to the present exemplary embodiment, as illustrated in FIG. 10, a motor 100 is disposed in addition to the motor 20. The motor 20 drives at least the pickup roller 22, the sheet feeding roller 23, and the registration roller pair 24, and the motor 100 drives at least the fixing unit 13 and the photosensitive drum 19. A configuration of the fixing unit 13, a grammage obtainment method, and image forming conditions according to the present exemplary embodiment are the same as those in the first exemplary embodiment, and thus the detailed redundant description will be omitted.

Figure 11:
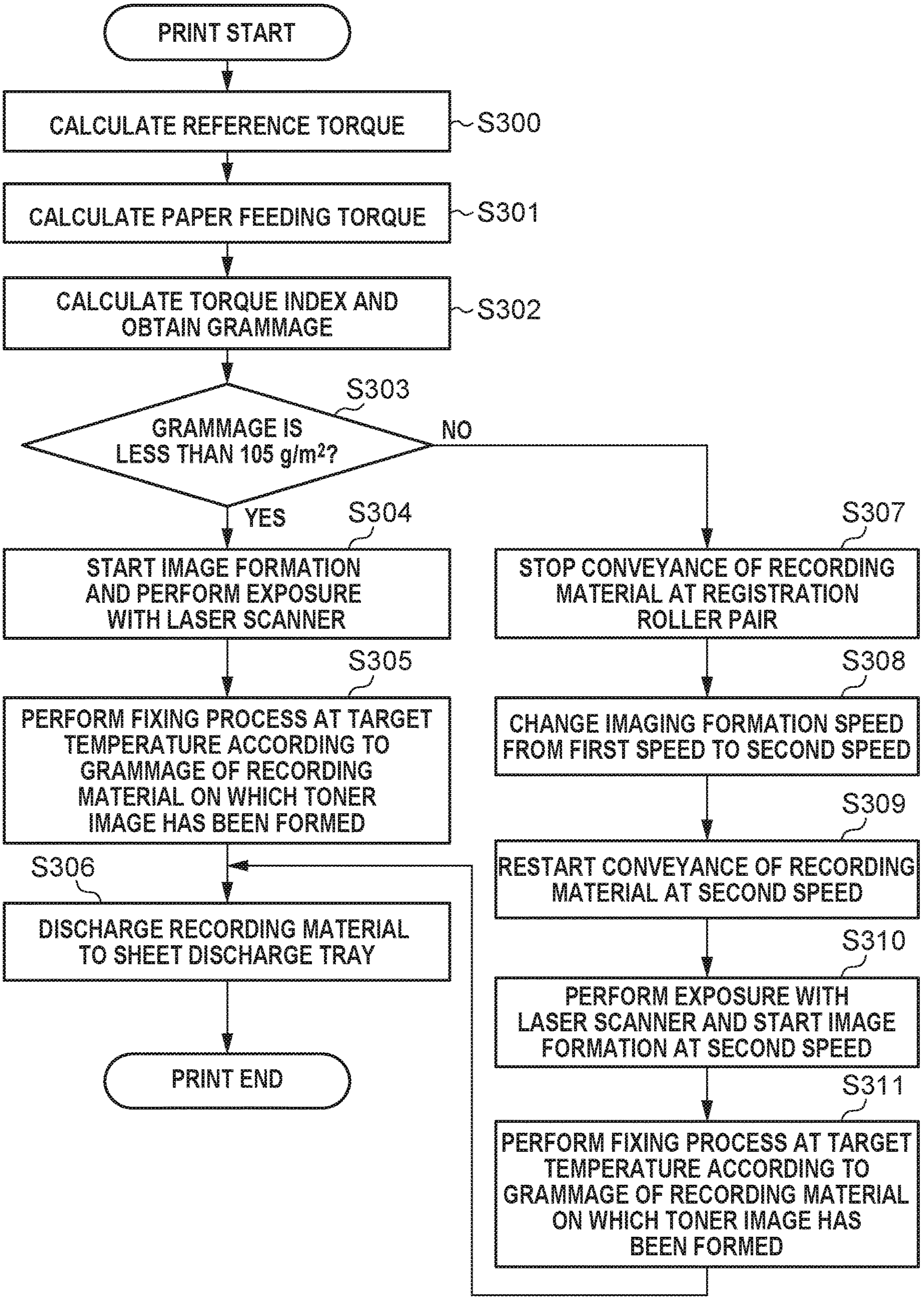
FIG. 11 is an operation flowchart of the image forming apparatus according to the third exemplary embodiment.

An operation of the image forming apparatus 1 according to the present exemplary embodiment will be described with reference to a flowchart illustrated in FIG. 11. In step S300, the image forming apparatus 1 starts a printing operation, driving is performed at the first speed, and the control unit 40 calculates a reference torque, which is a mean value of the driving torque of the motor 20. In step S301, the control unit 40 calculates a feeding torque, which is a mean value of the driving torque of the motor 20 from when a recording material P is conveyed by the pickup roller 22 until when the recording material P reaches the registration roller pair 24.

In step S302, the control unit 40 calculates a torque index and obtains a grammage of the recording material P. In step S303, the control unit 40 determines whether the obtained grammage is less than 105 g/m$^2$. In a case where the grammage is less than 105 g/m$^2$ (YES in step S303), the processing proceeds to step S304. In step S304, the control unit 40 starts image formation by starting exposure with the laser scanner 11, and forming an electrostatic latent image on the photosensitive drum 19. In step S305, the recording material P to which the toner image has been transferred at the transfer nip portion T is conveyed to the fixing unit 13, and a fixing process is performed on the recording material P on which the toner image has been formed.

In this process, the target temperature of the fixing unit 13 is set to a target temperature corresponding to the obtained grammage of the recording material P. That is, in the case of a recording material P having a small grammage, the target temperature of the fixing unit 13 is set to be low, and in a case of a recording material P having a large grammage, the target temperature of the fixing unit 13 is set to be high. In step S306, the recording material P subjected to the fixing process in the fixing unit 13 is discharged to the sheet discharge tray 27. In a case where printing is continuously performed on a plurality of recording materials P, the processing returns to step S301 to repeat the printing operation.

Next, a case where the obtained grammage is more than or equal to 105 g/m$^2$ (NO in step S303) will be described. In this case, the control unit 40 determines that the second speed is optimum as the conveyance speed of the recording material P. Here, in the present exemplary embodiment, since the motor 20 for driving the pickup roller 22, the sheet feeding roller 23, the registration roller pair 24 is different from the motor 100 for driving the photosensitive drum 19 and the fixing unit 13, in step S307, conveyance of the recording material P is stopped at the timing when the leading end of the recording material P reaches the registration roller pair 24 and the grammage of the recording material P is determined to be more than or equal to 105 g/m$^2$ by the control unit 40.

In step S308, the rotational speed of the motor 100 is changed to change the process speed at the image forming portion to the second speed. In step S309, the rotation speed of the motor 20 is also changed, and the conveyance of the recording material P at the second speed is resumed.

After the above described process, in step S310, exposure with the laser scanner 11 and development are performed at the second speed, and the toner image formed on the photosensitive drum 19 is transferred to the recording material P at the transfer nip portion T. In step S311, the recording material P to which the toner image has been transferred is conveyed to the fixing unit 13 and subjected to the fixing process. The fixing temperature at this process is set to an optimum target temperature corresponding to the grammage of the recording material P. That is, 170° C. or 180° C. is set with reference to Table 1. In step S306, the recording material P on which the fixing process has been performed is discharged to the sheet discharge tray 27, and the printing operation ends.

As described above, in the present exemplary embodiment, two driving motors are disposed, and thus the image formation speed at the image forming portion is able to be changed after the grammage of the recording material is obtained. In a case where the recording material P to be originally conveyed at the second speed is fed at the first speed, conveyance of the recording material P is temporarily stopped, and the conveyance speed is changed from the first speed to the second speed. With this configuration, the recording material P is able to be conveyed at the second speed, which is the optimum speed. Thus, the transfer voltage at the transfer nip portion T and the target temperature during the fixing process in the fixing unit 13 is able to be set to more optimal values.

Alternatively, in a configuration in which one driving motor is disposed, a clutch or the like can be disposed in a roller, such as the registration roller pair 24, for conveyance of the recording material P to stop conveyance of the recording material P. The process speed and the target temperature of the fixing unit 13 are changed while conveyance of the recording material P is stopped and then the conveyance of the recording material P is resumed, whereby the same effect is able to be obtained.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-135507, filed Aug. 29, 2022, which is hereby incorporated by reference herein in its entirety.

What is claimed is:

1. An image forming apparatus comprising:

a sheet feeding cassette configured to store a sheet;

a pickup roller configured to feed the sheet stored in the sheet feeding cassette;

an image forming portion configured to form an image on the sheet fed by the pickup roller;

a first conveyance guide configured to guide the sheet fed by the pickup roller, wherein the first conveyance guide is disposed at a position that is upstream from the image forming portion with respect to a conveyance direction of the sheet, and the first conveyance guide is further configured to guide the sheet in a direction away from the image forming portion when viewed in a vertical direction;

a second conveyance guide configured to guide the sheet fed by the pickup roller, wherein the second conveyance guide is connected to the first conveyance guide, is disposed at a position that is upstream from the image forming portion and downstream from the first conveyance guide with respect to the conveyance direction, and is further configured to guide the sheet in a direction approaching the image forming portion when viewed in the vertical direction;

a driving motor configured to drive the conveyance roller;

a torque detection unit configured to detect a value related to a driving torque of the driving motor; and a control unit configured to determine an image forming condition under which image formation is to be performed on the sheet at the image forming portion, wherein the control unit determines the image forming condition in accordance with a result of detection by the torque detection unit, wherein the torque detection unit detects the value related to the driving torque during a period in which the sheet is fed by the pickup roller and in which the sheet is present at a curved part of a conveyance path formed by the first conveyance guide and the second conveyance guide, and wherein a curvature radius of the curved part is less than or equal to 150 mm (millimeter).

2. The image forming apparatus according to claim 1, further comprising a fixing unit configured to fix the image on the sheet by heating the sheet on which the image has been formed at the image forming portion, wherein a temperature of the fixing unit is increased with increase in the value related to the driving torque detected by the torque detection unit.

3. The image forming apparatus according to claim 1, wherein a conveyance speed of the sheet is decreased with increase in the value related to the driving torque detected by the torque detection unit.

4. The image forming apparatus according to claim 1, wherein detection by the torque detection unit is performed for a predetermined time period from when the pickup roller starts rotating.

5. The image forming apparatus according to claim 1, further comprising a thermometer configured to measure a temperature, wherein the image forming condition is changed in accordance with a result of detection by the torque detection unit and a measurement result of the thermometer.

6. The image forming apparatus according to claim 1, further comprising a hygrometer configured to measure a humidity, wherein the image forming condition is changed in accordance with a result of detection by the torque detection unit and a result of measurement by the hygrometer.

7. The image forming apparatus according to claim 1, further comprising:

a thermometer configured to measure a temperature; and a hygrometer configured to measure a humidity, wherein the image forming condition is changed in accordance with a result of detection by the torque detection unit, a result of measurement by the thermometer, and a result of measurement by the hygrometer.

* * * * *